W. A. GEIGER.
HAND BRAKE FOR RAILWAY CARS.
APPLICATION FILED AUG. 23, 1918.
1,300,376.
Patented Apr. 15, 1919.
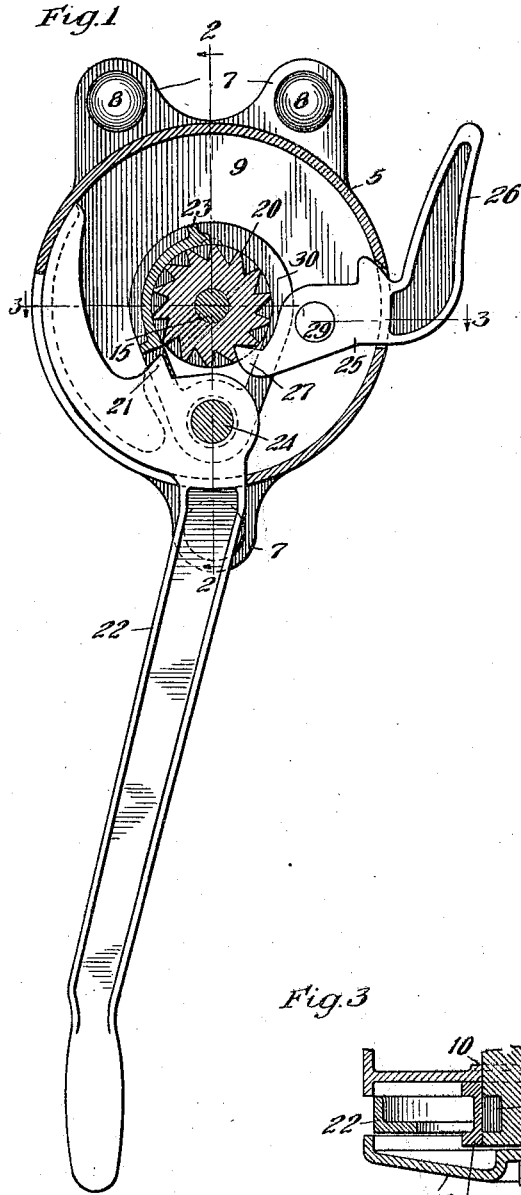
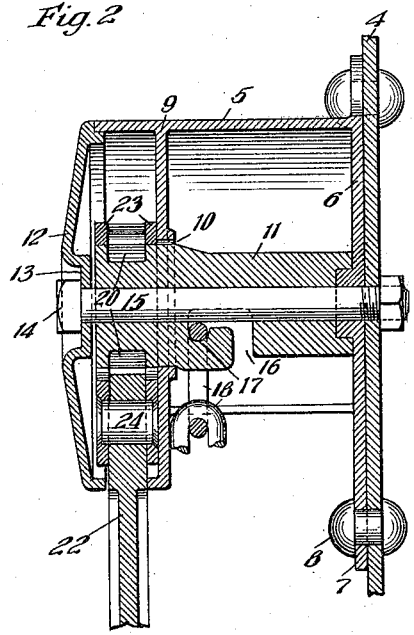
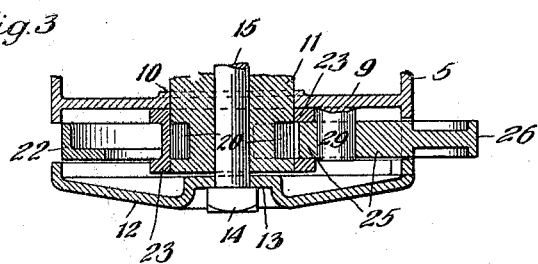
Inventor
William A. Geiger
By George I. Haight
Atty.

UNITED STATES PATENT OFFICE.

WILLIAM A. GEIGER, OF CHICAGO, ILLINOIS, ASSIGNOR TO WILLIAM H. MINER, OF CHAZY, NEW YORK.

HAND-BRAKE FOR RAILWAY-CARS.

1,300,376. Specification of Letters Patent. Patented Apr. 15, 1919.

Application filed August 23, 1918. Serial No. 251,058.

*To all whom it may concern:*

Be it known that I, WILLIAM A. GEIGER, a citizen of the United States, residing at Chicago, in the county of Cook and State of Illinois, have invented a certain new and useful Improvement in Hand-Brakes for Railway-Cars, of which the following is a full, clear, concise, and exact description, reference being had to the accompanying drawings, forming a part of this specification.

My invention relates to improvements in hand brakes for railway cars.

One of the objects of my invention is to provide, in a brake employing a ratchet wheel and a hanger for the supporting of an operating lever, means to permit a locking dog to coöperate with the ratchet within the space upon said ratchet covered by the hanger. Other objects will appear from the description of the invention hereinafter following.

In the drawings forming a part of this specification, Figure 1 is an end view, partly in cross section, of a hand brake embodying my invention; Fig. 2 is a longitudinal, vertical, sectional view taken on line 2—2 of Fig. 1; and Fig. 3 is a longitudinal, horizontal, sectional view taken on line 3—3 of Fig. 1. Referring to the drawings, the numeral 4 indicates the end of a car to which the brake mechanism is adapted to be attached. A housing is shown at 5, provided with an inner wall 6 and having flanges 7 adapted for the passage of the rivets 8, by means of which the housing is secured to the car. An outer wall is indicated at 9, centrally perforated as at 10 for the passage of the drum 11. At its outer end the housing is provided with a cover plate 12 having a depressed center 13 to receive the head 14 of the bolt or axle 15, which extends from said cover plate through the drum 11, the inner wall 6 and the end of the car 4, and is provided with a nut at its inner end. The drum is provided with the slot 16 suitably notched as at 17 for the attachment of the brake chain 18, which, it will be readily understood, is extended downwardly to the brake mechanism underneath the car—not shown in the drawing. At its outer end, and in the space between the cover plate 12 and the outer wall 9 of the casing 5, the drum is provided with a preferably integral ratchet, suitably toothed, as most clearly shown at 20 in Fig. 1 of the drawing, the said ratchet being adapted to be engaged by the operating pawl 21 provided upon the lever or brake handle 22. The said handle is supported by means of a hanger 23, which extends about the ratchet and is pivoted to the handle at 24. A holding pawl 25, provided with a handle 26 and a tooth 27, for engagement with the ratchet, is pivoted, as at 29, to the casing, and its inner end, bearing the tooth 27, extends through a slot 30 provided in the hanger 23, in order that the holding pawl may engage the ratchet at the same section of its periphery as is engaged by the tooth 21 upon the operating handle 22. By means of this arrangement, a narrower operating pawl and a narrower ratchet can be employed than could otherwise be used, and thus the brake can be made compact and extended a minimum distance from the face of the car to which it is attached. The operation of the device will be readily understood. In winding up the brake chain, the operating handle is employed, and, at the end of each winding movement of the operating handle, the locking pawl, through gravity exerted upon its outer end, maintains the locking tooth 27 thereof in engagement with the ratchet, preventing its accidental rearward rotation. In releasing, the locking pawl is moved from engagement with the ratchet by lifting the handle 26.

I claim:

1. In a brake, the combination with a rotatable drum, of a ratchet wheel associated therewith, a hanger of substantially annular form telescoped over the ratchet wheel, said hanger having an opening formed therein, the opening being located intermediate the side planes of the hanger, a pawl-operating lever pivotally mounted within said opening of the hanger and adapted to have the pawl thereof coöperate with the ratchet wheel, and a locking pawl adapted to be also extended through said opening to coöperate with said ratchet wheel.

2. In a brake, in combination, a rotatable drum, a ratchet wheel associated therewith, an operating handle, a hanger mounted upon said ratchet wheel, said handle being pivotally connected to said hanger, and a locking pawl, said handle being provided with an operating pawl tooth to engage the ratchet wheel, said hanger being provided with a slot for the passage of the locking pawl therethrough, said operating pawl tooth and the locking pawl engaging the periphery of the ratchet between the two planes perpendicular to the axis of the drum which are located by the inner and outer faces of said hanger.

In witness that I claim the foregoing I have hereunto subscribed my name this 19th day of Aug., 1918.

WILLIAM A. GEIGER.